United States Patent
Fleury et al.

(10) Patent No.: US 7,860,111 B2
(45) Date of Patent: Dec. 28, 2010

(54) METHOD FOR RESERVING BANDWIDTH IN AN ETHERNET TYPE NETWORK

(75) Inventors: Jean-François Fleury, Beijing (CN); Jean-Baptiste Henry, Melesse (FR)

(73) Assignee: Thomson Licensing, Boulogne-Billancourt (FR)

( * ) Notice: Subject to any disclaimer, the term of this patent is extended or adjusted under 35 U.S.C. 154(b) by 936 days.

(21) Appl. No.: 10/539,432

(22) PCT Filed: Dec. 29, 2003

(86) PCT No.: PCT/EP03/51110

§ 371 (c)(1), (2), (4) Date: Feb. 8, 2006

(87) PCT Pub. No.: WO2004/066561

PCT Pub. Date: Aug. 5, 2004

(65) Prior Publication Data

US 2006/0159123 A1 Jul. 20, 2006

(30) Foreign Application Priority Data

Jan. 2, 2003 (FR) .................................. 03 00006

(51) Int. Cl.
*H04L 12/28* (2006.01)
(52) U.S. Cl. ..................... 370/400; 370/85; 370/402; 370/465; 370/513
(58) Field of Classification Search .................. 370/85, 370/85.5, 85.6, 230, 395.53, 396, 402, 403, 370/410, 453, 465, 468, 513
See application file for complete search history.

(56) References Cited

U.S. PATENT DOCUMENTS

| 4,459,588 | A | * | 7/1984 | Grow | ........................ 370/455 |
| 4,538,147 | A | * | 8/1985 | Grow | ........................ 370/452 |
| 4,566,097 | A | * | 1/1986 | Bederman | ................... 370/455 |
| 4,785,449 | A | * | 11/1988 | Nakamura et al. | .......... 370/451 |
| 4,858,232 | A | * | 8/1989 | Diaz et al. | ................... 370/465 |
| 5,072,449 | A | * | 12/1991 | Enns et al. | ................... 714/776 |
| 5,191,580 | A | * | 3/1993 | Nakano et al. | ............. 370/453 |

(Continued)

OTHER PUBLICATIONS

Chitra Venkatramani: "The Design, Implementation and Evaluation of Rether: A Real Time Ethernet Protocol", on line, pp. 1-125.
Search Report Dated Apr. 19, 2004.

*Primary Examiner*—Ayaz R Sheikh
*Assistant Examiner*—Andrew C Lee
(74) *Attorney, Agent, or Firm*—Robert D. Shedd; Joseph J. Opalach; Jerome G. Schaefer

(57) ABSTRACT

The inventive method for reserving at least one node of a communication network like the Ethernet bus in the form of a predetermined fraction of the Ethernet bus bandwidth consists in circulating a token between the network nodes in such a way that they are enabled to successively transfer an Ethernet packet to a bus according to a given sequence which defines a chronological order for the token passage between nodes and in which a predetermined fraction of the bandwidth reserved for a network node corresponds in sequence to a certain number of passage occurrences of the token through the considered node. Said invention can be used for domestic communication networks like the Ethernet bus.

4 Claims, 2 Drawing Sheets

U.S. PATENT DOCUMENTS

| | | | |
|---|---|---|---|
| 5,274,637 A * | 12/1993 | Sakamura et al. | 370/455 |
| 5,313,466 A * | 5/1994 | Zhao et al. | 370/453 |
| 5,383,186 A * | 1/1995 | Shin et al. | 370/453 |
| 5,388,097 A * | 2/1995 | Baugher et al. | 370/455 |
| 5,390,182 A * | 2/1995 | Zheng | 370/236 |
| 5,404,424 A * | 4/1995 | Zhao et al. | 370/453 |
| 5,631,908 A * | 5/1997 | Saxe | 370/235 |
| 5,684,960 A * | 11/1997 | Geyer et al. | 370/252 |
| 5,742,812 A * | 4/1998 | Baylor et al. | 707/8 |
| 5,862,397 A * | 1/1999 | Essafi et al. | 712/22 |
| 5,878,221 A * | 3/1999 | Szkopek et al. | 709/218 |
| 5,922,063 A * | 7/1999 | Olnowich et al. | 710/317 |
| 5,933,607 A * | 8/1999 | Tate et al. | 370/395.61 |
| 5,960,002 A * | 9/1999 | Ramfelt et al. | 370/450 |
| 6,005,869 A * | 12/1999 | Sakai et al. | 370/452 |
| 6,161,138 A * | 12/2000 | Gross et al. | 709/225 |
| 6,185,217 B1 * | 2/2001 | Ando et al. | 370/403 |
| 6,320,871 B1 * | 11/2001 | Mizuguchi et al. | 370/452 |
| 6,356,565 B1 * | 3/2002 | Bouyer et al. | 370/468 |
| 6,389,030 B1 * | 5/2002 | Coden | 370/404 |
| 6,590,865 B1 * | 7/2003 | Ibaraki et al. | 370/230 |
| 6,631,137 B1 * | 10/2003 | Lorrain et al. | 370/401 |
| 6,751,213 B1 * | 6/2004 | Sun et al. | 370/352 |
| 6,891,828 B2 * | 5/2005 | Ngai | 370/357 |
| 6,944,165 B2 * | 9/2005 | Fujiyama et al. | 370/400 |
| RE39,216 E * | 8/2006 | Worsley et al. | 370/395.53 |
| 7,099,922 B2 * | 8/2006 | Pospesel et al. | 709/208 |
| 7,272,651 B1 * | 9/2007 | Bolding et al. | 709/227 |
| 2002/0059408 A1 * | 5/2002 | Pattabhiraman et al. | 709/223 |
| 2002/0178250 A1 * | 11/2002 | Haartsen | 709/223 |
| 2004/0202199 A1 * | 10/2004 | Fischer et al. | 370/474 |

* cited by examiner

METHOD FOR RESERVING BANDWIDTH IN AN ETHERNET TYPE NETWORK

This application claims the benefit, under 35 U.S.C. §365 of International Application PCT/EP03/51110, filed Dec. 29, 2003, which was published in accordance with PCT Article 21(2) on Aug. 5, 2004 in French and which claims the benefit of French patent application No. 0300006, filed Jan. 2, 2003.

FIELD OF THE INVENTION

The invention relates to Ethernet bus type communication networks and, more particularly, such "domestic" networks.

BACKGROUND

It is known that an Ethernet bus type communication network operates according to the CSMA/CD mode, in other words, by carrier sensing with collision detection. Some research work has proposed the use of priority allocation mechanisms implemented in the Ethernet packets to enable, in this type of communication network, data streams to be transmitted over the Ethernet bus. However, this type of priority allocation mechanism is intended more for computer networks organized around routers. It is not suited to small communication networks of the domestic network type in which the elements are passive.

The object of the invention is to propose a mechanism for reserving, on at least one node of an Ethernet bus type communication network, a certain fraction of the bus bandwidth so as to enable a data stream to be transmitted, for example, an audio/video stream according to the DVB (Digital Video Broadcast) standard.

The idea on which the invention is based is to superimpose on the communication protocol of a digital bus, bus access arbitration by the circulation of a token between the nodes of the network so as to be able to control the times of write mode access to the bus by the nodes of the network. The term token denotes a write permission which is granted to a node of the network in the sense of a so-called token-ring network. The bandwidth is divided into cycles during which the write permission of the token passes from one node to another according to a predetermined and reproducible strategy over a number of cycles.

The document "Rether: A Real-Time Ethernet Protocol" by Chitra VENKATRAMANI, published in November 1996, describes a network consisting of nodes having a permission to send during a time slot dependent on the previously reserved bandwidth. A control node divides up the bandwidth temporally by creating a first list of nodes having requested bandwidth, and a second list of nodes not having reserved. During a cycle, the terminals of the first list send their messages first, then the terminals of the second list have their turn during the remaining time. When the end of the cycle occurs, the message transmissions by the nodes of the second list are stopped and resume on the next cycle at the point at which they were interrupted in the second list. In this document, not all the terminals are sure to be able to have their turn during a cycle.

SUMMARY OF THE INVENTION

More particularly, the object of the invention is to devise a method for reserving, on at least one node of an Ethernet bus type communication network, a predetermined fraction of the bandwidth of the digital bus during a cycle; characterized in that it consists in:

having a token circulate between the nodes of the network (A, B, C, D) so as to enable the nodes of the network to send in turn a data packet over the bus (1) according to a predefined sequence defining a chronological order of passage of the token between all the nodes during a cycle; and in which the predetermined fraction of the bandwidth reserved for a node of the network corresponds in the sequence to a certain number of occurrences of passage of the token via the node concerned.

The invention relates to digital bus type domestic communication networks comprising network nodes configured to apply the method defined above. The invention ensures that each node of the network will be able to have a turn at least once during a cycle.

The method according to the invention offers the following refinements:

the occurrences of passage of the token via a node of the network are distributed in the sequence among the occurrences of passage of the token via the other nodes of the network to avoid jitter effects;

the chronological order of passage of the token between the nodes of the network is defined by a master node of the network;

the master node, on initialization of the network, constructs a first table storing, for each node of the network, information indicative of the fraction of bandwidth reserved for the node of the network and, on the basis of the first table, the master node constructs a second table storing the sequence defining the order of passage of the token between the nodes of the network.

The invention can be extended further to a communication device designed to be connected to a digital bus communication network, characterized in that it is configured to have a token circulate between the nodes of the network during a cycle and in that it is organized to construct a first table storing, for each node of the network, information indicative of a fraction of the bus bandwidth reserved for the node of the network and a second table storing a sequence defining a chronological order of passage of the token between all the nodes during a cycle, the fraction of the bandwidth reserved for a node of the network corresponding in the sequence to a certain number of occurrences of passage of the token by the node concerned.

BRIEF DESCRIPTION OF THE DRAWINGS

Other features and advantages of the present invention will become apparent from the description of the exemplary embodiments below, taken as non-limiting examples, with reference to the appended figures in which.

DETAILED DESCRIPTION

Figure 1:
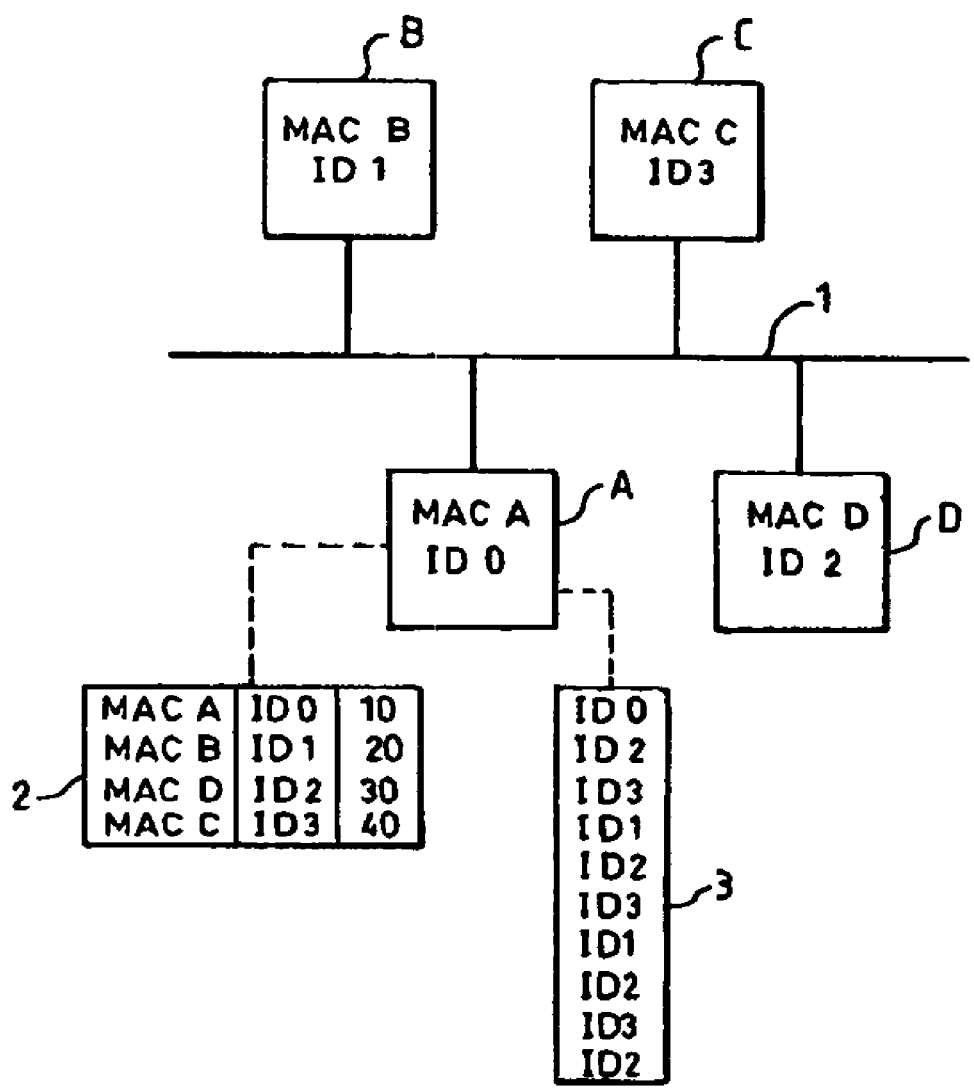
FIG. 1 represents very schematically an Ethernet bus type domestic communication network according to an exemplary embodiment of the invention.

The Ethernet bus type domestic communication network illustrated in FIG. 1 here comprises four network nodes represented by the blocks A, B, C and D, which can be consumer communication devices such as a dish antenna receiver, a digital decoder, an optical disc reader and a television. The Ethernet bus is indicated by the reference 1. It normally comprises a twisted-wire pair. Such a domestic communica--

The Ethernet bus is one example, the present invention relates to any type of digital bus in which a token is passed between terminals, the USB bus being another example.

In this domestic communication network, Ethernet bus access arbitration via a mechanism for circulating a token is superimposed on the Ethernet protocol to enable data streams to be transmitted over the network, for example audio and/or DVB video streams. The circulation of the token between the nodes A, B, C and D of the network allows the different nodes of the network write mode access to the Ethernet bus 1 in turn with no risk of collision. When it has the token, a node sends over the bus 1 to a recipient node, one and only one Ethernet packet (layer 2—OSI model), the maximum payload of which is 1500 bytes, plus, where appropriate, control packets (protocol management).

According to the present exemplary embodiment of the invention, the nodes of the network can each reserve a fraction of the bus bandwidth. In the example illustrated in the table of item 2 of FIG. 1, the node A has reserved 10 Mb per second, the node B has reserved 20 Mb per second, the node D has reserved 30 Mb per second and the node C has reserved 40 Mb per second. The information indicative of the fraction of bandwidth reserved by each node is collected by a master node of the network, in this case node A, and is stored in a table of item 2 mapped with the physical network addresses of the nodes. The physical addresses of the network nodes A, B, C and D are respectively represented by MAC A, MAC B, MAC C, and MAC D, and the logical network addresses of the nodes are respectively represented by ID 0, ID 1, ID 2, and ID 3. These logical addresses are used in the network messages to circulate the token.

On the basis of the table of item 2, the master node A constructs, in a table, in the form of a list, such as in item 3 of FIG. 1, a sequence defining the chronological order of passage of the token between all the nodes in such a way that the predetermined fraction of the bandwidth reserved for each node of the network during a cycle corresponds in the sequence to a certain number of occurrences of passage of the token by the node concerned.

The sequence defining the chronological order of passage of the token can be constructed by the master node A using a greater common divisor calculation between the reserved bandwidth fractions. In the example of FIG. 1, the total available bandwidth is 100 Mb per second. The greater common divisor is 10 Mb per second. On this basis, the sequence defining the chronological order of passage of the token will include one passage occurrence for the node A, two passage occurrences for the node B, three passage occurrences for the node D and four passage occurrences for the node C. These passage occurrences are symbolized in the table of item 3 by the logical addresses ID 0, ID 1, ID 2, and ID 3 of the nodes.

Moreover, the occurrences of passage of the token by a node of the network can advantageously be distributed evenly in the sequence among the occurrences of passage of the token by the other nodes of the network, for example using the Bellman algorithm, as illustrated in the table of item 3 in FIG. 1. This distribution can be used to avoid jitter effects.

The operation of the nodes of the network to apply the method according to an exemplary embodiment of the invention is now described with reference to FIG. 2.

Initialization of the Ethernet Bus and Election of the Master Node

When the Ethernet bus is initialized, one or more nodes of the network must be configured as master nodes of the network. On receipt of an initialization network message sent from one of the nodes of the network, each node configured as a master node sends over the Ethernet bus 1 a first network message containing the physical address of the node. These first network messages are sent over the bus 1 from each node with a limited random delay. When the maximum delay for transmission of the first network message expires, the node configured as a master node which has the highest physical address is determined by default as the master node of the network. In the example of FIG. 2, the master node of the network is the node A, the physical address of which is represented by MAC A.

Notification of Election of the Master Node on the Network and Logical Numbering of the Other Nodes of the Network The master node of the network sends over the bus 1 a second network message to announce to the other nodes of the network that it is the master node and that it has a logical address, in this case represented by ID 0. When the second network message is received by all the other nodes of the network, each other node of the network returns over the bus 1 a third network message M3 containing the physical address of the node, for example MAC B for the node B, and, optionally, information indicative of the fraction of bandwidth reserved by the node, for example 20 Mb per second for the node B. To avoid collisions of Ethernet network messages on the bus 1, the time interval between the moment of receipt of the second network message in a node and the moment of transmission of the third network message M3 is a limited random delay of maximum value T1. If a node of the network does not receive a fourth message M4 from the master node before the delay T1 counted from the moment of receipt of the second network message, it again immediately returns a third network message M3 over the bus as illustrated in the FIG. 2 for the node C.

In response to the receipt of a third network message M3, the master node A returns to the sending node, for example the node B, the fourth network message M4 comprising the logical address assigned to the node, for example ID 1 for the node B. The master node increments the logical addresses assigned to the nodes of the network as it receives the third network messages M3.

This process of numbering of the nodes of the network by interchanges of third and fourth network messages M3, M4 is represented by the part I of the timing diagram. At the same time that the fourth network messages M4 are sent over the bus 1, the master node A constructs the association table of item 2 containing, for each node of the network, the physical addresses MAC A MAC B, MAC C, MAC D, and logical addresses ID 0, ID 1, ID 2, ID 3 of the node and the information indicative of the fraction of bandwidth reserved by the node.

After a delay equivalent to two times the delay T1, counted from the moment of transmission of the second network message, the master node A constructs the table of item 3 containing the sequence defining the chronological order of circulation of the token between the nodes of the network as indicated above and transmits it to each node of the network.

Figure 2:
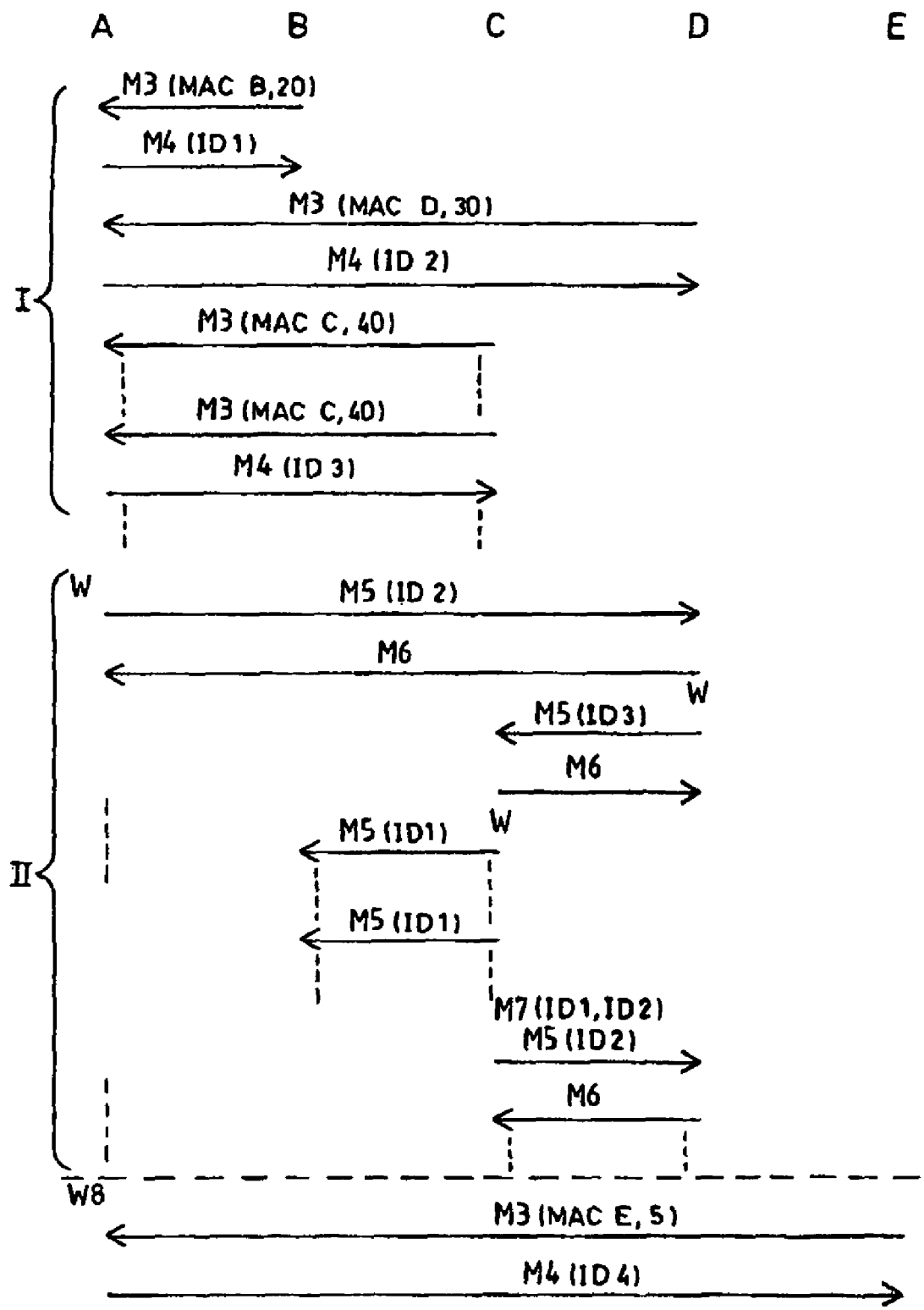
FIG. 2 is a timing diagram illustrating the operation of the network nodes to apply the method according to an exemplary embodiment of the invention.

After a delay equivalent to three times the delay T1, counted from the moment of transmission of the second network message, the nodes of the network are ready to start the token circulation mechanism illustrated by the part 11 of the timing diagram in FIG. 2. This delay T1 is a parameter that must be set on initialization of the network according to the number of nodes connected to the bus 1 in order to optimize the time needed to initialize the network.

Each node that holds the token can write an Ethernet packet once to the bus 1, then transfers the token to a next node and so on according to the chronological order defined in the table of item 3. To control the circulation of the token from node to node, fifth network messages M5 and sixth network messages M6 are interchanged between the nodes of the network. In the token circulation mechanism according to an exemplary embodiment of the invention, the master node A, with logical address ID 0, always has the token first and can write to the bus 1 as symbolized by the reference W in the FIG. 2. It then sends the token to the next node in the sequence, which is the node D with logical address ID 2 via a fifth network message M5. The fifth message M5 is an Ethernet transmission message received by all the nodes of the network to enable them to follow in parallel the circulation of the token in their table of item 3. On receipt of the fifth network message, the node D returns over the bus 1 the sixth network message as an acknowledgement for the node A. This process continues thus from node to node according to the chronological order defined in the table of item 3.

Now, if, after a delay T2 counted from the moment of transmission of the fifth network message M5 from a node of the network, no sixth message M6 is sent over the bus, the node in question again returns the sixth network message M6 as illustrated for the node C in FIG. 2. If no sixth network message M6 is sent over the bus 1 within the delay T2 as indicated above, the current node having the token, for example the node C in FIG. 2, sends over the bus 1 a seventh network message M7 indicating that the next node in the sequence is no longer available, in the example, the node B with logical address ID 1, and containing the logical address of the new next node in the sequence, in this case the node D with logical address ID 2. In response to the receipt of the seventh network message M7, the other nodes of the network update the table of item 3 by deleting the occurrences of passage of the token by the failed node, in the example, the occurrences symbolized by ID 1. The current node having the token then sends a fifth network message M5 containing the logical address of the new next node to continue the token circulation mechanism.

In the case where the failed node is the master node, the current node sends over the bus a network initialization message which triggers the election of a new master node and the construction of a new table for item 3 according to the same principle illustrated by the part I of the timing diagram.

After having sent its data, and before passing the token, a node can send to the master node a message M3 to change its bandwidth reservation. The master node returns a message M9 indicating either that the reservation has been successful or that it has failed (if, for example there is not enough available bandwidth left). If the reservation is accepted, the master node modifies its table of item 2. The next time the cycle passes via the master node, the latter updates the table of item 3 and transmits it over the network before recommencing a cycle. It should be noted that a certain percentage of the bandwidth must be kept in reserve as a safety margin to ensure that the algorithm for calculating the list for the passage of the token is executed correctly, given the approximations made to map the bandwidth reservation with the number of occurrences of the token. As an example, this percentage may be approximately 10%.

When the token returns to the first occurrence of the master node in the table of item 3, the master node A recommences the cycle illustrated by part 11 of the timing diagram.

It is possible to provide for the master node A, before recommencing the cycle illustrated by part 11 of the timing diagram, to cyclically run a procedure to update the tables of items 2 and 3 to take account of the changes of configuration of the network, in particular the connection of new peripheral devices. This update procedure can be carried out with a period T3 very much longer than the delays T1 and T2. According to this update procedure, the master node A sends over the bus an eighth network message M8 enabling the new devices connected to the bus to be identified as a new node of the network as illustrated by the reference E in FIG. 2. Within the delay T2 counted from the moment of transmission of the eighth network message M8, the master node A then waits for the receipt of one or more third network messages M3. FIG. 2 represents, by way of example, the exchange of a third network message M3 and a fourth network message M4 between the master node A and the new node C. Each time a message M3 is received, the time counter is reset. At the end of the delay T2, the master node reconstructs, if there has been a change, a new table for item 3 and transmits it over the bus 1.

In practice, for the token circulation mechanism to operate correctly, the delay T1 is set to be greater than the delay T2 and less than the delay T3. As an example, T1 can be set to 100 ms, T2 to 5 ms and T3 to 3 minutes.

With this token circulation mechanism, it is possible to guarantee each node of the network the use of a certain fraction of the available bandwidth on the bus for the transmission of data streams.

This token circulation mechanism can be implemented simply in the nodes of the network by software configuration.

The invention claimed is:

1. A method for reserving, on a node of an Ethernet bus type communication network having parallel connections to nodes, a fraction of bandwidth of a digital bus during a cycle, the method comprising:

circulating a token between all nodes of the network so as to enable all nodes of the network to send in turn a data packet over the bus according to a sequence defining a chronological order of passage of the token between all nodes during a cycle, wherein the chronological order of passage of the token between all nodes of the network is defined by a master node of the network;

wherein the fraction of bandwidth reserved for the node of the network corresponds in the sequence to a certain number of occurrences of passage of the token via the node, and wherein the master node, on initialization of the network, constructs a first table, stores in said first table for each node of the network information indicative of the fraction of bandwidth reserved for each node, and on the basis of the first table, constructs and transmits to each node a second table storing the sequence defining the order of passage of the token between the nodes of the network that reserved a fraction of bandwidth, and wherein each node that reserved a fraction of bandwidth transmits the token via the Ethernet network to a next node that reserved a fraction of bandwidth in the sequence, the transmission of the token is received by all nodes in parallel such that each node of the network follows circulation of the token.

2. The method according to claim 1, in which the occurrences of passage of the token via the node of the network are distributed in the sequence among the occurrences of passage of the token via other nodes of the network.

3. A communication device designed to be connected to a digital bus communication network, the device comprising:

a connection as a master node to the network; and a token, wherein the master node is configured to circulate the token between all nodes of the network during a cycle, and wherein the master node is organized to construct a first table storing, for each node of the network, information indicative of a fraction of the bus bandwidth reserved for each node of the network and to construct and to transmit to each node a second table storing a sequence defining a chronological order of passage of the token between nodes that reserved a fraction of bandwidth during a cycle, the fraction of the bandwidth reserved for any one node of the network corresponding in the sequence to a certain number of occurrences of passage of the token via the one node, and wherein each node that reserved a fraction of bandwidth transmits the token to a next node that reserved a fraction of bandwidth in the sequence, the transmission of the token is received by all nodes in parallel such that each node of the network follows circulation of the token.

4. A communication device designed to be connected to a digital bus communication network, the device comprising:
a connection as a node to the digital bus communication network; and
a table received from a master node of the network storing a sequence defining a chronological order of passage of a token between the nodes that reserved a fraction of bandwidth during a cycle, the fraction of the bandwidth reserved for a node of the network corresponding in the sequence to a certain number of occurrences of passage of the token via the node, wherein the node that reserved a fraction of bandwidth transmits the token to the next node that reserved a fraction of bandwidth in the sequence so that each node of the network can follow the chronological order in the sequence, and wherein each node that reserved a fraction of bandwidth transmits the token to a next node that reserved a fraction of bandwidth in the sequence, the transmission of the token is received by all nodes in a parallel manner such that each node of the network can follow circulation of the token.

* * * * *